United States Patent [19]

Male et al.

[11] Patent Number: 4,928,079

[45] Date of Patent: May 22, 1990

[54] CIRCUIT BREAKER AUXILIARY SWITCH ASSEMBLY

[75] Inventors: Andrew J. Male, Export; Melvin A. Carrodus, Brighton Twp., Beaver County, both of Pa.

[73] Assignee: Westinghouse Electric Corp., Pittsburgh, Pa.

[21] Appl. No.: 223,841

[22] Filed: Jul. 25, 1988

[51] Int. Cl.[5] .................................... H02B 1/08

[52] U.S. Cl. .................................... 335/13; 200/330; 200/573

[58] Field of Search .................... 200/144 R, 573, 329, 200/330; 335/13

[56] References Cited

U.S. PATENT DOCUMENTS 3,955,162 5/1976 Nicol .................................... 335/13

4,794,356 12/1988 Vu et al. .................................... 335/13

*Primary Examiner*—Robert S. Macon

*Attorney, Agent, or Firm*—M. J. Moran

[57] ABSTRACT

A circuit breaker auxiliary switch structure characterized by a contact arm carrying a first contact movable between open and closed positions with a second contact. An auxiliary switch is disposed in the path of movement of the contact arm and operable to open or close an auxiliary circuit associated with a circuit breaker.

4 Claims, 1 Drawing Sheet

CIRCUIT BREAKER AUXILIARY SWITCH ASSEMBLY

BACKGROUND OF THE INVENTION

1. Field of the Invention

This invention relates to circuit breakers and, more particularly, to auxiliary switches therefor.

2. Description of the Prior Art

An auxiliary switch consists of "normally open" and/or "normally closed" contacts mounted in a circuit breaker that is actuated whenever the breaker is opened or closed. Usually the switches are in the form of small single-pole, double-throw, snap switches providing "normally opened" and "normally closed" contacts within the circuit breaker housing. Auxiliary switches are connected in control circuits whenever it is desirable to indicate whether the breaker is opened or closed. For example, indicting lights are occasionally mounted on switchboards to furnish a visual indication that the circuit is energized. An indicating light is to be lit whenever a breaker is closed. Or, there are some applications where it is desirable to have an indicating light (red) lit when the breaker is closed and another indicating light (green) lit when the breaker is open.

Auxiliary switches of prior construction were costly because of an excessive number of parts which involved close tolerances that required frequent adjustment.

SUMMARY OF THE INVENTION

In accordance with this invention, a circuit breaker having an auxiliary switch structure is provided comprising an electrically insulating housing, a circuit breaker within the housing and including first and second contacts operable between open and closed positions; a releasable mechanism in an initial position and movable when released to a tripped position to effect automatic opening of the contacts; the first contact carrying arm being movable between open and closed positions of the contacts; auxiliary switch means in the path of movement of the arm for opening or closing an auxiliary circuit when the arm is actuated; the switch means comprising a frame, a plunger slidably mounted on the frame, and a switch on the frame and engaging the plunger; and the switch being actuated when the arm moves to the open contact position.

The advantage of the auxiliary switch of this invention is that not only is it comprised of a minimum number of parts and requires no adjustment, but the switch assembly is adapted to plug-in installation.

DESCRIPTION OF THE PREFERRED EMBODIMENT

The circuit breaker of the type generally involved herein is described in U.S. Pat. No. 4,713,504, issued Dec. 15, 1987, to Alfred E. Maier. More particularly, that patent involves a plurality of poles with each pole including a plurality of spaced parallel arcing and main contact arms. For brevity only one arcing and main contact arm are described herein.

Figure 1:
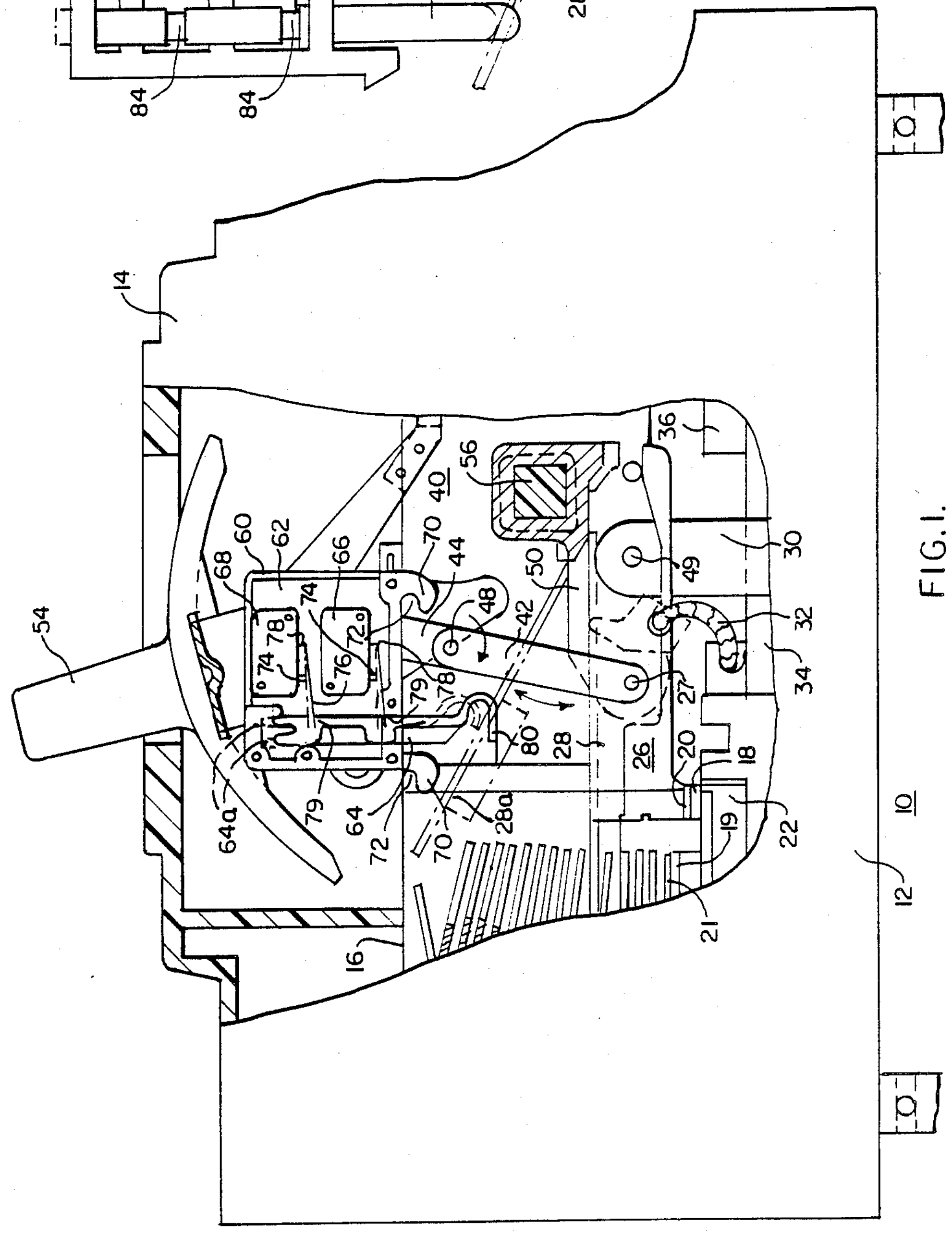
FIG. 1 is a fragmentary sectional view through a circuit breaker showing an auxiliary switch mounted in accordance with the invention.

A molded case circuit breaker is generally indicated at 10 in FIG. 1 and it comprises a housing base 12 and a cover 14. The base and the cover are assembled at a parting line 16 and create an internal compartment in which circuit breaker apparatus is disposed which includes a fixed main contact 18 and a movable main contact 20. Fixed and movable arcing contacts 19 and 21, respectively, are also provided. The fixed contacts 18 and 19 are mounted on a conductor 22 to which a bus bar or terminal may be connected.

The movable main contact 20 is mounted on contact carrying arm 26 and the movable arcing contact 21 is mounted on arcing contact carrying arm **26*a*. These arms are pivotally mounted on a contact arm carrier 28 at pivot 27. The contact arm carrier is pivotally mounted to a base frame 30 at pivot 49. A flexible conductor or shunt 32 extends from the arm 26 to a conductor 34 connected to a conductor 36 which may be connected to a terminal (not shown). Although a circuit extends from a line terminal (not shown) through the several parts 22, 28, 20, 26, 32, 34, and 36** to a load terminal (not shown), the circuit breaker may also operate where the current direction is reversed. For a more complete description of the circuit breaker operation, reference is made to U.S. Pat. No. 4,656,444 which is incorporated herein by reference.

An operating mechanism generally indicated at 40 is provided for opening and closing the contacts by means of a conventional toggle assembly which includes a lower toggle link 42 and an upper toggle link 44 which are pivotally interconnected at pivot 48. The lower toggle link is pivoted at 27 on a rotatable bracket 50 which is pivoted at 49.

Opening of the contacts 18, 20 is accomplished either by a handle 54 of the operating mechanism 40, or automatically by tripping in response to over-current conditions occurring in the circuit. In the contact-closed position, the contact arm carrier 28 is disclosed in the solid line position (FIG. 1). In the tripped position, the contact arm carrier 28 is disposed in the broken-line position **28*a*. The bracket 50 is connected to a cross bar 56 which is interconnected with contact arm carriers in adjacent pole units of multiple pole circuit breaker for opening and closing corresponding contacts similar to the contacts 18, 20, simultaneously. Accordingly, when the operating mechanism 40 actuates the contact arm 26** between open or closed positions, the contact arms in adjacent poles of the circuit breaker are moved correspondingly by the operating mechanism.

In accordance with this invention, an auxiliary switch 60 is mounted on a housing frame member (not shown) in one of the poles above the contact arm carrier 28. The switch includes a frame 62, an actuator or plunger 64, and one or more microswitches 66, 68. The frame 62 includes a pair of hook portions 70 which are adapted to engage portions 72 of the frame of the housing base 12.

The microswitches 66, 68 are fixedly mounted on the frame 62 and each switch is provided with a switch button 74 and an actuator or lever 76 which is pivotally mounted at 78 and extends over the depressible switch button 74. The plunger 64 is slidably mounted on the frame 62 and is comprised of a pair of similar notches 79 in which the outer end portions of the lever 76 are disposed. The lower end portion of the plunger 64 comprises a hook portion having an end portion 80 which is transversely disposed with respect to the direction of movement of the plunger in its normal condition. When the contacts 18, 20 open, the contact arm carrier 28 moves to the broken line position 28*a* where it strikes the end portion 80 of the plunger and slides the plunger upwardly with the upper end portion of the plunger moving to broken-line position 64*a*. Simultaneously, the levers 76 move upwardly to depress the switch button 74 to energize or de-energize the microswitches 66, 68 which are either normally open or normally closed.

More particularly, the lower end portion of the plunger 64 including the end portion 80 is partially flexible and therefore deforms to the broken-line position 28*a* when the switch arm 28 moves. One advantage of the slight flexibility of the end portion 80 is that it compensates for any over-travel of the switch arm 28 when it initially opens.

Figure 2:
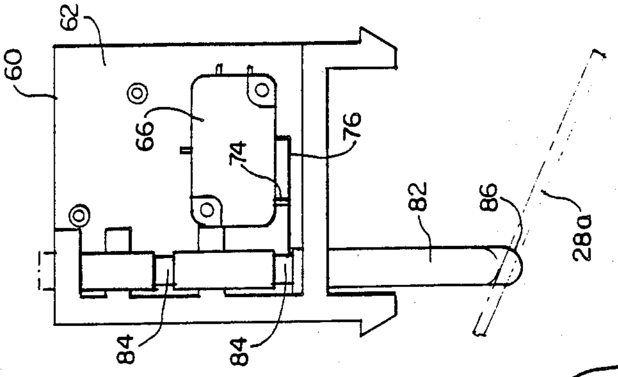
FIG. 2 is an elevational view of another embodiment of the invention.

Another embodiment of the invention is shown in FIG. 2 in which similar numerals refer to similar parts. In FIG. 2, the auxiliary switch 60 includes an elongated plunger 82 having spaced notches 84 in which the outer end portions of the levers 76 are disposed. The lower end of the plunger 82 has a semi-spherical surface 86 for engagement with the switch arm 28 as it rises to the position shown, whereby the plunger 82 rises to move the lever 76. Thus, unlike the lower end portion 80 of the plunger 64 (FIG. 1), the plunger 82 (FIG. 2) has a non-deflectable end portion and simply moves up and down in response to movement of the switch arm 28.

Accordingly, the device of this invention provides an auxiliary switch assembly having a minimum number of parts which do not require close tolerances and which do not require adjustment during assembly. The normally open or closed microswitches are useful for actuating red or green lights on a switchboard to indicate the opened or closed positions of the circuit breaker.

What is claimed is:

1. A circuit braker, comprising:

an electrically insulating housing;

a circuit breaker means within the housing and comprising first and second contacts operable between open and closed positions;

a releasable mechanism in an initial position and movable when released to a tripped position to effect automatic opening of the contacts;

the first contact carrying arm movable between open and closed positions of the contacts; and auxiliary switch means including a plunger in the path of movement of the arm for opening or closing an auxiliary circuit when the arm is actuated, said plunger having a flexible portion capturing said arm which accommodates overtravel of said arm when said arm is actuated.

2. The switch of claim 1 in which switch means comprises a frame, a switch on the frame, and the plunger being movably mounted on the frame.

3. The switch of claim 2 in which the plunger is slidably mounted and engages a switch actuator for opening and closing the auxiliary switch when the arm is moved.

4. The switch of claim 3 in which the arm actuates the switch when the arm moves to the open contact position.

* * * * *